US007274626B2

(12) United States Patent
Kawato et al.

(10) Patent No.: US 7,274,626 B2
(45) Date of Patent: Sep. 25, 2007

(54) MAGNETO-OPTICAL RECORDING USING A HEATING ELEMENT

(75) Inventors: Yoshiaki Kawato, Sendai (JP); Kenchi Ito, Cambridge (GB)

(73) Assignee: Hitachi, Ltd., Tokyo (JP)

( * ) Notice: Subject to any disclaimer, the term of this patent is extended or adjusted under 35 U.S.C. 154(b) by 363 days.

(21) Appl. No.: 10/893,887

(22) Filed: Jul. 20, 2004

(65) Prior Publication Data
US 2005/0163962 A1 Jul. 28, 2005

(30) Foreign Application Priority Data
Jan. 23, 2004 (JP) .............................. 2004-015116

(51) Int. Cl.
*G11B 11/00* (2006.01)
(52) U.S. Cl. ................. 369/13.07; 369/13.13
(58) Field of Classification Search ............. 369/13.13, 369/13.33; 360/59
See application file for complete search history.

(56) References Cited

U.S. PATENT DOCUMENTS

| 5,051,970 | A | * | 9/1991 | Ishii et al. ............... 369/13.49 |
| 5,233,578 | A | | 8/1993 | Yamamoto et al. |
| 5,237,548 | A | * | 8/1993 | Muchnik ................ 369/13.35 |
| 6,507,540 | B1 | * | 1/2003 | Berg et al. ............... 369/13.13 |
| 6,636,460 | B2 | * | 10/2003 | Akiyama et al. ......... 369/13.14 |
| 6,762,977 | B1 | * | 7/2004 | Gage et al. .............. 369/13.13 |
| 6,809,908 | B1 | * | 10/2004 | Ito et al. .................. 369/13.13 |
| 6,952,380 | B2 | * | 10/2005 | Isshiki et al. ............ 369/13.33 |
| 6,975,564 | B2 | * | 12/2005 | Uchida et al. ........... 369/13.03 |
| 7,133,230 | B2 | * | 11/2006 | Saga et al. .................... 360/59 |

| 2005/0071859 | A1 | * | 3/2005 | Coehoorn et al. ....... 369/13.13 |

FOREIGN PATENT DOCUMENTS

| JP | 63-276731 | 11/1988 |
| JP | 2-189751 | 7/1990 |

OTHER PUBLICATIONS

J.J. Ruigrok et al, "Disk Recording Beyond 100 Gb/in.2: Hybrid Recording?", Journal of Applied Physics, vol. 87, No. 9, May 1, 2000, pp. 5398-5403.
Y. Kanai et al, "Recording Field Analysis of Narrow-Track SPT Head with Side Shields, Tapered Main Pole, and Tapered Return Path for 1 Tb/in2", IEEE Transactions on Magnetics, vol. 39, No. 4, Jul. 2003, pp. 1955-1960.
S. Iwasaki, "Perpendicular Magnetic Recording—Evolution and Future", IEEE Transactions on Magnetics, vol. MAG-20, No. 5, Sep. 1984, pp. 657-662.

* cited by examiner

*Primary Examiner*—Tan Dinh
(74) *Attorney, Agent, or Firm*—Mattingly, Stanger, Malur & Brundidge

(57) ABSTRACT

A perpendicular magnetic recording medium for thermomagnetic printing has an ultra-high recording density and is resistant to thermal decay of magnetization. An intermediate layer of the medium is provided between a first recording layer using a low-noise Co alloy ferromagnetic substance and a second recording layer using a ferrimagnetic substance (e.g., a rare-earth element-transition metal compound) having a compensation temperature below an operation ambient temperature. A magnetic field is applied thereto to form a magnetization pattern on the first recording layer. It is then heated-up to be printed onto the second recording layer, which has a higher coercivity at the ambient temperature, and a recording field is suitably set to form a magnetization pattern only on the first recording layer. The magnetization pattern is printed from the first recording layer to the second recording layer.

8 Claims, 12 Drawing Sheets

DIRECTION OF MEDIUM MOVEMENT

MAGNETO-OPTICAL RECORDING USING A HEATING ELEMENT

CLAIM OF PRIORITY

The present application claims priority from Japanese application serial no. 2004-015116, field on Jan. 23, 2004, the content of which is hereby incorporated by reference into this application.

BACKGROUND OF THE INVENTION AND RELATED ART STATEMENT

The present invention relates to a magnetic recording method utilizing thermo-magnetic printing, magnetic recording media for thermo-magnetic printing, and a magnetic disk recording apparatus in connection with ultra-high density magnetic recording technology.

With the development of information technology, digitalizing in various fields is being rapidly advanced. There arises the need for storing a large amount of digital information data not only in conventional personal computers and servers but also in consumer electronics and audio products. To store the enormous amounts of data, a magnetic disk recording apparatus as the core for a nonvolatile filing system is required to rapidly make its capacity larger more than ever before. Making the capacity of the magnetic disk recording apparatus larger means further increasing a bit density recorded on magnetic recording media, that is, an areal recording density.

A recording method employed in a magnetic disk recording apparatus currently in practical use is generally called longitudinal recording. This is a method for recording information by using a ferromagnetic thin film having a high coercivity in the direction parallel with the surface of a disk substrate as a magnetic recording medium to magnetize the magnetic recording medium along the surface of the substrate. In this case, a magnetization reversal point in which longitudinal magnetizations are opposite to each other at an angle of 180 degrees corresponds to bit 1.

To increase the areal recording density, the bit density in the disk circumferential direction (linear density) and the bit density in the disk radius direction (track density) must be increased at the same time. The track density is limited by a process for pole-shaping of a recording/reproducing head and the positioning accuracy of a mechanism, which are mostly only technical problems. It is considered that increasing the linear density is subject to a principle limit due to the fact that a magnetic recording medium is an aggregate of ferromagnetic particles.

In the longitudinal recording, magnetizations are opposite to each other with respect to a magnetization reversal point, and a large internal magnetic field called a demagnetizing field is produced in the direction reducing the magnetizations around the magnetization reversal point. The demagnetizing field forms in the magnetization reversal point a magnetization transition area having a finite width, that is, an area in which magnetization has not reached sufficient saturation.

When the magnetization transition area is relatively large, the magnetization transition areas interfere with each other as the bit spacing is narrower so that the substantial magnetization reversal position is shifted. The width of the magnetization transition area must be at least smaller than the bit pitch.

To increase the linear density, a magnetic recording medium must overcome the demagnetizing field for magnetization; specifically, the coercivity of the magnetic recording medium must be increased and the thickness of the recording magnetic film must be reduced to suppress the demagnetizing field. The linear density is strongly limited by the structure and the magnetic characteristic of a magnetic recording medium.

In standard longitudinal recording, the ratio of the linear density to the track density is desirably about 5 to 10. When realizing a recording density of 100 gigabits (gigabit=$10^9$ bits) per square inch under the condition, the bit pitch in the circumferential direction is about 25 nm. When estimating the necessary characteristic of a magnetic recording medium whose magnetization reversal width is below 25 nm in a simplified model, the film thickness of the magnetic recording medium must be below 15 nm and the coercivity thereof must be above 5 kOe (kilooersteds).

A recording field which can be produced by the magnetic recording device of the longitudinal recording is considered to be only about 9 kOe by assuming 2.4 T (teslas) as the maximum saturation magnetic flux density (hereinafter, Bs) which can be expected to be a usable magnetic pole material. In this case, when the coercivity of a medium recording layer exceeds 5 kOe, it is difficult to secure a recording field which can sufficiently magnetize the magnetic recording medium.

When the thickness of a Co alloy magnetic film is below 15 nm, the substantial volume of the magnetic recording medium crystal particles is small. As compared with a magnetic anisotropy energy (that is, an energy stabilizing magnetization in the fixed direction) of the individual particles, the magnitude of a thermal energy (that is, an energy disturbing magnetization) cannot be ignored.

The thermal fluctuation of magnetization is significant so that there arises the problem of thermal decay of magnetization in which the magnitude of recording magnetization is reduced as time elapses. To suppress the thermal decay of magnetization, the coercivity must be increased or the volume of the crystal particles must be larger.

When the magnetic field of a magnetic head is limited as described above, there is a limit to an allowable coercivity. Increasing the film thickness for making the volume of the crystal particles larger means an increase in magnetization transition area due to increased demagnetizing field, that is, a decrease in possible linear density.

When securing the volume of the crystal particles by the crystal size along the surface of the substrate, the randomness of the magnetization distribution in a magnetic recording medium is increased. The medium noise is increased so that a sufficient S/N ratio cannot be obtained. Principle difficulty is expected to realize longitudinal recording which can satisfy the conditions of robustness for thermal decay of magnetization, low noise and sufficient recording and exceeds 100 gigabits per square inch.

To prevent the principle difficulty, perpendicular recording is proposed. The perpendicular recording is a method for forming the magnetization of a thin-film magnetic recording medium to be perpendicular to the surface of the film, which is different in recording principle from the prior art longitudinal magnetic recording medium. The perpendicular magnetic recording is not affected by a demagnetizing field since adjacent magnetizations are not opposite to each other and are arrayed to be anti-parallel. A magnetization transition area can be expected to be very small, which can easily increase a linear density. From the same reason, requirement to reduce the film thickness of a magnetic recording medium is not stronger than the longitudinal recording. High robustness for thermal decay of magnetization can be secured.

The perpendicular magnetic recording is focused on as a method essentially suitable for high-density magnetic recording. The materials and structures of various magnetic recording media and the construction of a thin-film magnetic head combining them are proposed. The perpendicular recording includes a method for using a medium having a single perpendicular magnetization film and a method for providing, in addition to a perpendicular magnetization film, a flux keeper layer adjacent to its disk substrate side and having a low coercivity and a high saturation magnetic flux density.

When using a two-layered perpendicular magnetic recording medium having the flux keeper layer, there can be considered the following advantages: (1) a demagnetizing field produced in a recording layer can be reduced; and (2) combination with a single-pole type magnetic recording device can produce a large recording field having a distribution steeper than that of a ring head used in the longitudinal recording. This technique is described in Non-Patent Document 1.

As a perpendicular magnetic recording medium of this type, there is studied a medium provided with a perpendicular magnetization film made of a CoCr alloy on the flux keeper layer made of a soft magnetic layer such as a permalloy, an Fe amorphous alloy or a microcrystal alloy. In recent years, there are studied, as recording layers, an artificial lattice film such as (Co/Pd)n or (Co/Pt)n and granular media in which Co magnetic fine particles are dispersed in $SiO_2$. As the keeper layer, there is used a stacked film stabilizing a magnetic domain by using an antiferromagnetic substance or a magnetic multilayer in which ferromagnetic layers are coupled to each other in an antiferromagnetic manner.

As described above, the perpendicular magnetic recording using a magnetic recording medium having a keeper layer is regarded as promising as a technique instead of the current longitudinal magnetic recording. In this method, the recording density is considered to be limited. The most major factor is that the recording field reaches the upper limit in principle so that the magnetic anisotropy energy determining the long-period stability of the magnetic recording medium cannot be increased.

In the perpendicular recording, a recording field larger than the ring head in the longitudinal recording can be expected as described above. In parameter setting assuming that an areal recording density is 1 tera-bit (tera=$10^{12}$) per square inch, in consideration of the shape of a magnetic field distribution, there is a studied result in which when using a material having the maximum saturation magnetic flux density in a transition metal magnetic substance of about 2.4 T=24 kG (kilogausses), about 16 kOe is the upper limit of a recording field (Non-Patent Document 2). In this case, the anisotropy magnetic field allowable value of the magnetic recording medium is up to about 16 kOe.

In some examples in which the possibility of magnetic recording whose areal recording density is 1 tera-bit per square inch has been studied by simulation, an anisotropy magnetic field of about 20 kOe is necessary and the above is predicted to be insufficient. There is considered a method for realizing a higher recording density by introducing a new element into recording only by a magnetic method. The two candidate methods are mainly considered.

(1) Thermally Assisted Recording (or Hybrid Recording)

The magnetic anisotropy energy of a magnetic recording medium is reduced only when applying a recording field, thereby permitting writing onto a magnetic recording medium having an anisotropymagnetic field larger than the recording field at room temperature. It is possible to use a magnetic recording medium having small crystal particles having a magnetic anisotropy energy larger than that of pure magnetic recording medium using a recording field of the same intensity, which may achieve a higher recording density.

For this method, some medium structures and head constructions have been proposed (Non-Patent Document 3).

(2) Recording Utilizing Thermo-Magnetic Printing

A magnetization pattern is written onto a specified, layer in a magnetic recording medium by a magnetic field from a magnetic recording device as in normal magnetic recording. The magnetic recording medium is heated to print the magnetization pattern onto another layer. The film thickness of a recording layer is substantially increased to secure long-period stability. The thermal stability may be lowered in a single layer initially written. A magnetic recording medium having small crystal particles can be used, which may achieve a higher recording density.

This method has been studied in the magnetooptical recording technology. In particular, it is considered to be a candidate method for a technique performing direct overwrite not via an erasure process generally conducted in magneto-optical recording.

Patent Document 1 discloses a technique recording onto a medium combining a Co—Cr alloy thin film for magnetic writing with a rare-earth element-transition metal alloy thin film printing its pattern by a method of combining magnetic recording with light exposure. Patent Document 2 discloses a technique printing a magnetization pattern from an "assist layer" increasing the coercivity by heating to a "recording layer" decreasing the coercivity by heating.

[Patent Document 1]
Japanese Patent Application Laid-Open No. Sho 63-276731

[Patent Document 2]
Japanese Patent Application Laid-Open No. Hei 2-189751

[Non-Patent Document 1]
IEEE Transactions on Magnetics, Vol. MAG-20, No. 5, September 1984, pp. 657-662, Perpendicular magnetic recording—Evolution and future '

[Non-Patent Document 2]
IEEE Transactions on Magnetics, Vol. MAG-39, No. 4, July 2003, pp. 1955-1960, Recording field analysis of narrow-track SPT head with side shields, tapered main pole, and return path for 1 Tb/in2'

[Non-Patent Document 3]
Journal of Applied Physics, Vol. 87, No. 9, May 2003, pp. 5398-5403, 'Disk recording beyond 100 Gb/in2: Hybrid recording?'

OBJECT AND SUMMARY OF THE INVENTION

The most major problem of applying the method (1) to a magnetic disk recording apparatus is in integration of a magnetic head. Typically, this method assumes that magnetic field application and heating are performed in almost the same area on a magnetic recording medium. It is very difficult to mount magnetic field generation means and magnetic recording medium heating means on one slider constructing a magnetic head. Actually, there is conducted an experiment in which the magnetic field application means is arranged on the top surface side of a magnetic recording medium and the magnetic recording medium heating means is arranged on the bottom surface side of the magnetic recording medium.

Realizing a magnetic disk recording apparatus using the method (1) as a recording method performing magnetic field application and medium heating at the same time is very disadvantageous as a technique used in a magnetic disk recording apparatus which is strongly required to be smaller and thinner.

As the method (2), a basic construction satisfying the requirement of recording for thermo-magnetic printing is disclosed. These objects are strictly in overwrite recording in magnetooptical recording. When applying the method to the magnetic disk recording apparatus, some problems arise.

In Patent Document 1, a magnetic recording device and an optical beam as heating/reproduction means are arranged on opposite sides of the magnetic recording medium. This is disadvantageous as the technique of the magnetic disk recording apparatus which is required to be smaller and thinner.

In Patent Document 2, a pattern is formed on the "recording layer" having the characteristic of a ferrimagnetic substance by a magnetic field from the magnetic pole to print it onto the "assist layer", and an optical beam is exposed onto the "recording layer" again for signal reproduction. Unlike magnetooptical recording assuming signal reproduction by an optical head, reproduction using a magneto-resistance effect is essential in the magnetic disk recording apparatus. Reproduction from the ferrimagnetic layer is not suitable. In Non-Patent Document 2, magnetic recording in which the ferrimagnetic substance is used for part of a magnetic recording medium is studied.

This discloses a result that the magnetic recording medium made of a rare-earth element-transition metal compound drastically increases noise with generation of magnetic wall, which is not suitable for magnetic recording at high recording density. When the magnetization pattern by a magnetic field is formed on the ferrimagnetic layer as in Patent Document 2, a signal having basically large noise is printed. When using this for magnetic recording to reproduce a signal from the same ferrimagnetic layer, only a signal having a low S/N ratio can be obtained, which cannot be applied to high-density magnetic recording for a magnetic disk.

A recording field in the magnetic recording method for a magnetic disk recording apparatus is about to reach a physical limit. In order to obtain recording performance with increased magnetic anisotropy of a magnetic recording medium to increase robustness for thermal decay of magnetization, there are considered the following two methods: (1) a thermally assisted method lowering the magnetic anisotropy only in recording; and (2) recording utilizing thermo-magnetic printing securing long-period stability by substantially increasing the film thickness (volume) by printing onto another layer after recording. Both prior art methods are not suitable as the small-sized and large-capacity HDD magnetic recording technique.

An object of the present invention is to provide a magnetic recording method and a magnetic recording medium which can achieve both robustness for thermal decay of magnetization and noise reduction and can realize an ultra-high recording density of 1 Tb/in$^2$ and a magnetic disk recording apparatus permitting integration.

To achieve the above object, according to the present invention, the magnetic recording method utilizing thermo-magnetic printing-uses as a printed layer a ferrimagnetic substance which has low Ms and high Hc at ambient temperature and has high Ms and low Hc in heating.

According to the magnetic recording method, magnetic recording medium and magnetic disk recording apparatus of the present invention, magnetization of the printed layer is small in magnetic field recording and is large in printing by heating. The recording performance of overwrite remains high to increase the long-period stability to reduce noise in reproduction. A high areal recording density exceeding 300 gigabits per square inch can be realized.

A magnetic recording medium applying the present invention has a first recording layer, a second recording layer, and an intermediate layer formed between the first recording layer and the second recording layer.

The first recording layer is formed with a magnetization pattern by a recording field. The second recording layer contains a material having a coercivity so as not to form a magnetization pattern by a recording field at ambient temperature, and lowering the coercivity and increasing the saturation magnetization at a temperature higher than the ambient temperature.

Here, ambient temperature Ta refers to an ambient temperature when the magnetic recording medium is not heated-up intentionally by the heating means. This corresponds to a temperature range in which the magnetic disk recording apparatus is normally operated and is in the range of –10 to 60° C. in a hard disk drive.

The intermediate layer disconnects exchange coupling of the first and second recording layers and magnetostatically couples the first and second recording layers.

In general, when two ferromagnetic thin films are successively stacked, magnetizations of both tend to be in the same direction by exchange coupling. When interposing the intermediate layer having above a certain thickness, the exchange coupling is smaller. It is known that magnetostatic coupling based on the Zeeman energy depending on saturation magnetizations of both appears.

The exchange coupling and the magnetostatic coupling arrange the magnetizations of the two magnetic substances in the same direction.

The exchange coupling is an interaction monotonously reduced with temperature rise. The magnetostatic coupling has an effect depending on saturation magnetization. When using a magnetic substance whose saturation magnetization is increased with temperature like the second recording layer, the coupling is strengthened by heating.

When the magnetostatic coupling functions in the two magnetic substances, this is equivalent to the reduction of the demagnetizing fields in both magnetic substances. Increasing or decreasing the demagnetizing field generally appear in the magnitude of a gradient near the coercivity of a magnetization curve. When the gradient is larger with increased saturation magnetization in the magnetization curve of a stacked film, the magnetostatic coupling functions.

A magnetization pattern is formed on the first recording layer by applying a magnetic field to a magnetic recording medium magnetostatically coupled by stacking the first and second recording layers via the intermediate layer. The magnetization pattern of the first recording layer to which the magnetic field has been applied is heated to print the magnetization pattern onto the second recording layer.

Through a series of the recording operations, the crystal particles in the first and second recording layers adjacent via the intermediate layer behave as a substantially one cluster. Consequently, the substantial crystal particle volume of the crystal particles in the first and second recording layers is increased. The magnetic domain structure is stable to reduce medium noise for realizing a magnetic recording medium whose robustness for thermal decay of magnetization is improved.

The intermediate layer 12 is interposed between the first and second recording layers. When the magnetization patterns of the first and second recording layers are different in overwrite, interference of the different magnetization patterns can be suppressed. A magnetic recording medium excellent in overwrite characteristic can be realized.

The magnetic recording method for recording a magnetization pattern onto a magnetic recording medium applying the present invention performs, with different timings, magnetic field application for recording a magnetization pattern onto the first recording layer and heating for printing the magnetization pattern of the first recording layer onto the second recording layer. The integration of a magnetic head is easy and the magnetic disk recording apparatus can be smaller and thinner.

Figure 1:
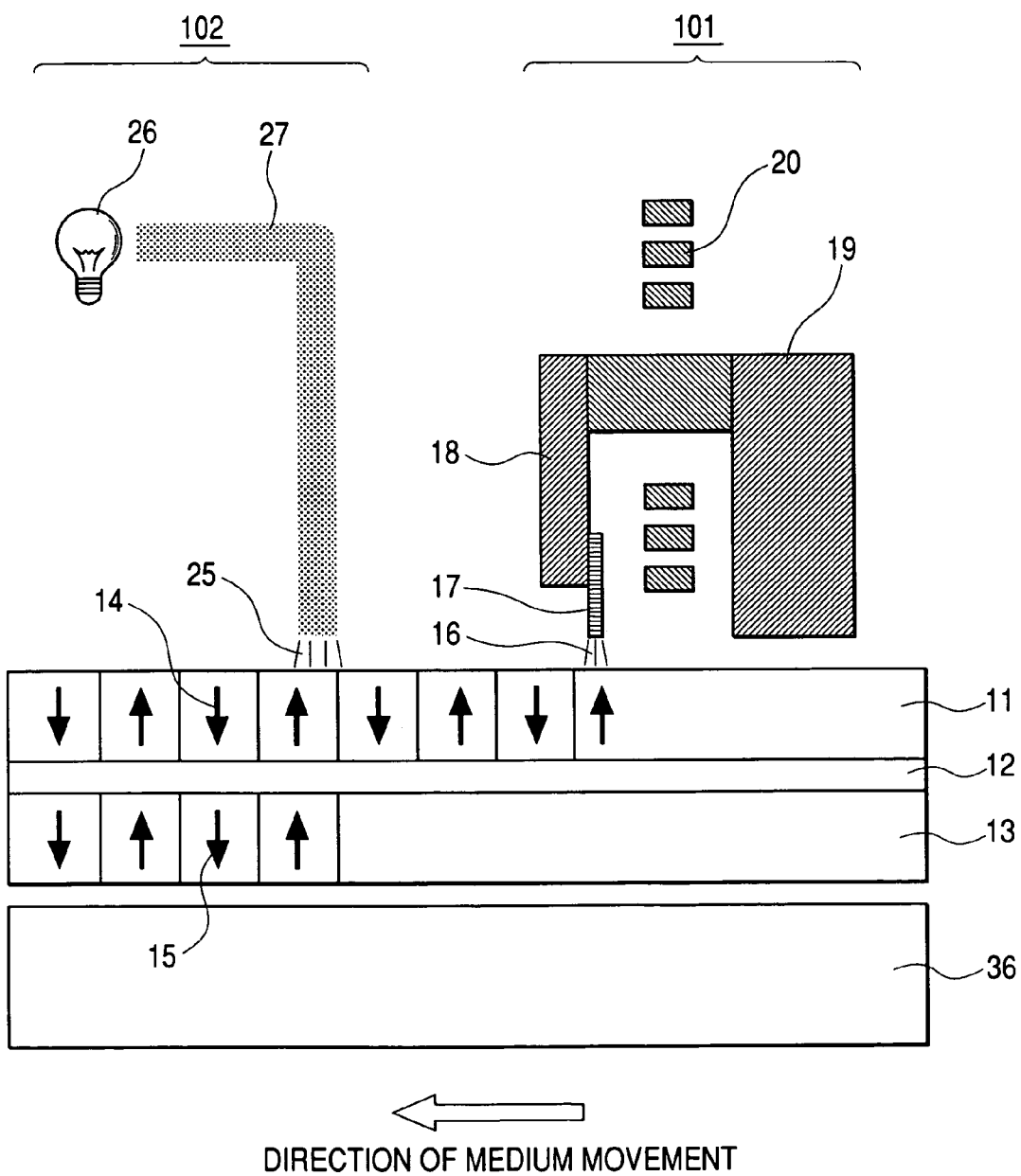
FIG. 1 is a schematic diagram of a magnetic recording system according to a first example.

The reference numerals in the drawings mean as follows:
11 . . . first recording layer, 12 . . . intermediate layer, 13, 13a, 13b . . . second recording layer, 14 . . . magnetization pattern formed on first recording layer, 15 . . . magnetization pattern formed on second recording layer, 16 . . . recording field, 17 . . . magnetic pole, 18 . . . yoke, 19, 19' . . . return path, 20 . . . magnetomotive coil, 25 . . . exposing light, 26 . . . light source, 27 . . . wave guide, 31 . . . protective layer and lubricant layer, 32 . . . antiferromagnetic coupling layer, 35 . . . spacer layer, 36 . . . flux keeper layer, 37 . . . underlayer,
38 . . . substrate, 61 . . . ferrimagnetic particle, 62 . . . nonmagnetic grain boundary, 71 . . . upper shield, 72 . . . lower shield, 73 . . . MR device, 101 . . . magnetic recording device, 102 . . . heating means, 103 . . . reproducing device, 121 . . . slider on which thin-film magnetic head is mounted, 122 . . . suspension arm, 123 . . . mechanism for head positioning, 124 . . . magnetic disk, 125 . . . spindle motor, 126 . . . external interface of magnetic disk recording apparatus, 127 . . . encoding data and recording part, 128 . . . reproduction and decoding, 129 . . . circuit for mechanical control

DETAILED DESCRIPTION OF PREFERRED EMBODIMENTS

Specific magnetic recording media applying the present invention will be described below in detail with reference to the drawings.

Example 1

Figure 2:
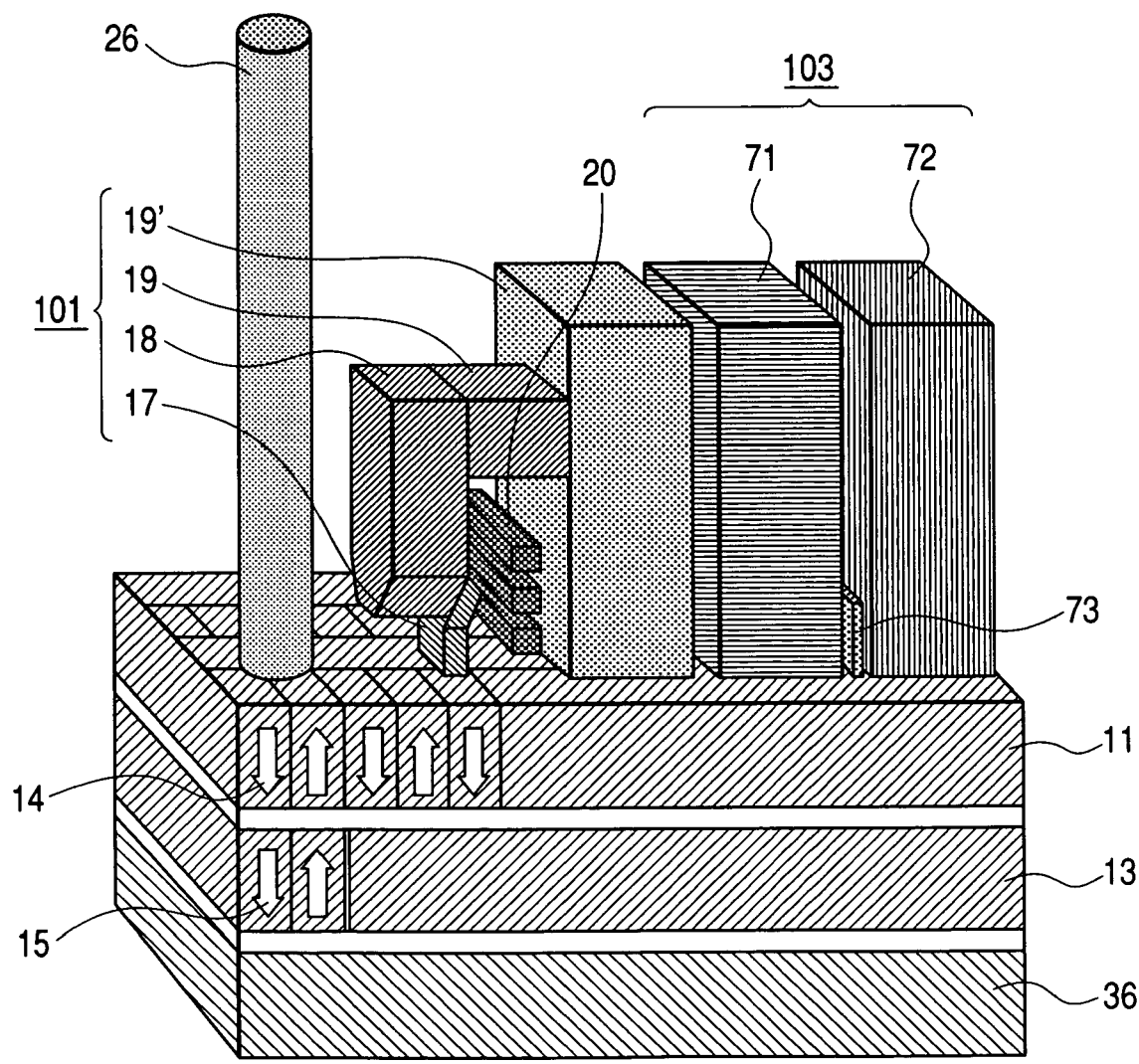
FIG. 2 is a perspective view of the magnetic recording system according to the first example.

FIG. 1 is a schematic diagram of a magnetic recording system embodying the present invention. A reproducing device is omitted. FIG. 2 shows a perspective view of the same system to which the reproducing device is added.

A magnetic recording device 101 has a magnetic pole 17 generating a recording field 16, a yoke 18 for supplying a magnetic flux thereto, a return path 19, and a conductor coil 20 for magnetizing these. Heating means 102 has a laser light source 26 and a waveguide 27. A semiconductor laser generating a light having a wavelength below 500 nm is desirably used as the laser light source 27.

The magnetic recording device 101 and a flux keeper layer 36 form a magnetic path in which a magnetic flux is refluxed. A magnetic recording medium is interposed therein. The recording field 16 from the magnetic pole 17 toward the flux keeper layer 36, that is, a magnetic field substantially perpendicular to the surface of the magnetic recording medium is applied.

The magnetic recording medium has a first recording layer 11, an intermediate layer 12, and a second recording layer 13 and is moved from the magnetic recording device in the left direction in the drawing. The heating means 102 locally heating-up the magnetic recording medium is positioned on the trailing side of the magnetic recording device.

In the arrangement, the recording field 16 from the magnetic recording device 101 is applied to the magnetic recording medium to form a magnetization pattern 14 on the first recording layer 11, and then, a light 25 generated from the heating means 102 is exposed to print a magnetization pattern 15 onto the second recording layer 13. A series of such recording operations is realized.

Figure 3:
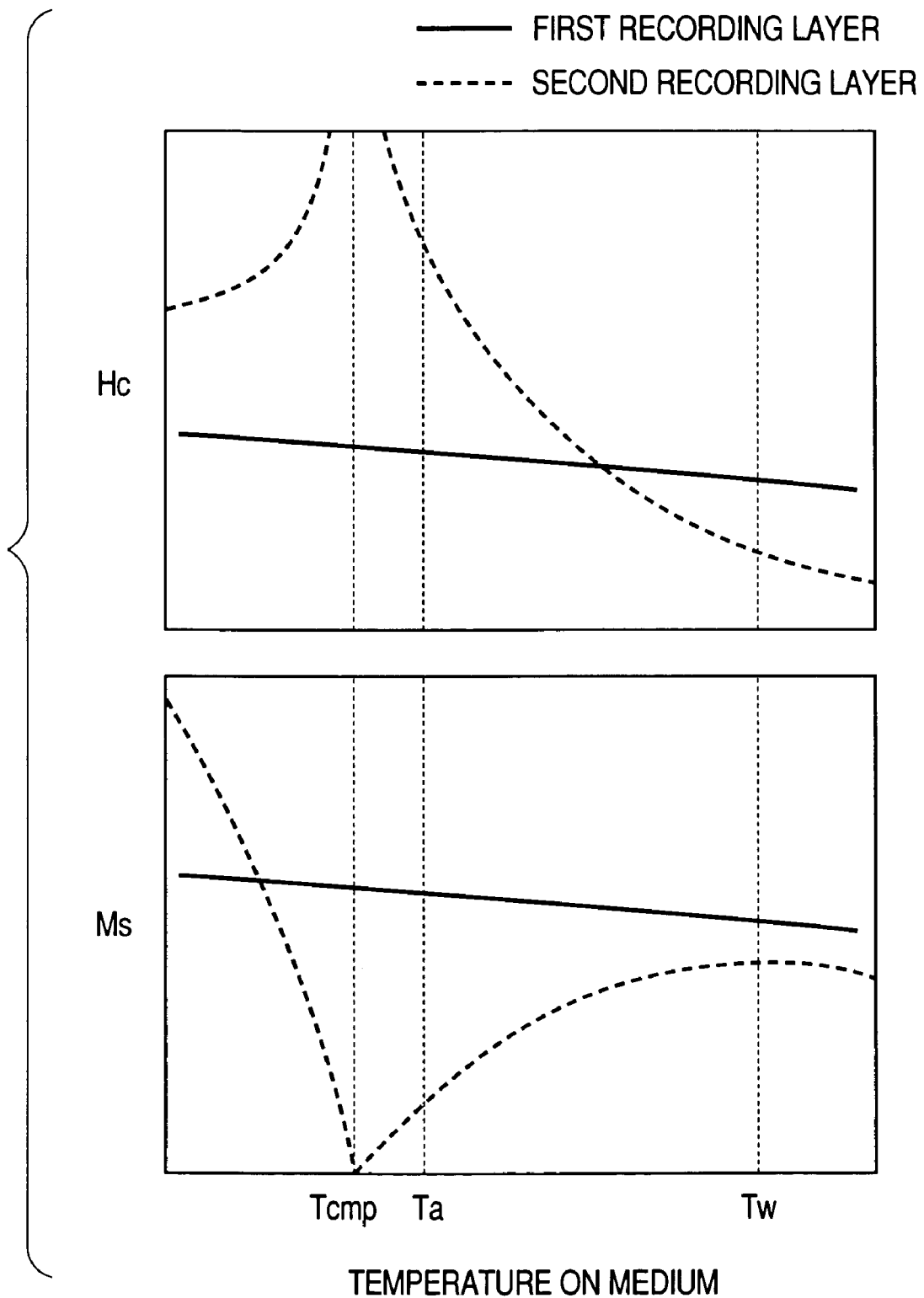
FIG. 3 shows temperature dependence of the magnetic characteristic of a magnetic recording medium used in the first example.

To explain the recording operation principle in greater detail, the temperature dependence of the coercivity and saturation magnetization of the respective layers of the used magnetic recording medium is shown in FIG. 3.

The first recording layer 11 is a ferromagnetic layer made of a CoCrPtB polycrystal. The first recording layer 11 may be a granular type ferromagnetic layer in which Co alloy crystal particles are dispersed in an $SiO_2$ matrix. In both cases, an easy axis is oriented so that a component perpendicular to the film surface is major.

These ferromagnetic substances generally have temperature characteristic in which the coercivity and saturation magnetization are both-monotonously reduced with temperature rise. TbFeCo as a ferrimagnetic substance is used as the second recording layer. The characteristic of the ferrimagnetic substance has a characteristic temperature called a "compensation temperature" (Tcmp of FIG. 3) in which saturation magnetization is 0. Since the coercivity has a maximum value near the Tcmp, the temperature dependence shows the curve indicated by the dotted line in the upper stage of FIG. 3. The recording operation using their temperature characteristics is as follows.

A desired recording field is generated from the magnetic pole at the ambient temperature Ta to form the magnetization pattern 14 on the first recording layer 11. The coercivity of the second recording layer 13 is set to be sufficiently large so as not to be magnetized by the recording field 16. The saturation magnetization of the second recording layer 13 is set to be small so as not to distort the magnetization pattern formed on the first recording layer 11 due to interference of a magnetostatic field generated from the second recording layer 13 with the recording field 16. Specifically, an optimal saturation magnetization range of the second recording layer at room temperature is 200 to 500 emu/cc.

The heating means 102 applies the exposing light 25 to the magnetization pattern 14. The temperature of center of spot of the exposing light 25 rises to temperature Tw. The magnetization of the second recording layer 13 is increased as in the lower stage of FIG. 3. The magnetostatic coupling energy between the first recording layer 11 and the second recording layer 13 is increased. The parallel magnetizations of both layers are stable in energy.

As shown in the upper stage of FIG. 3, the coercivity of the second recording layer 13 is rapidly reduced with temperature rise. It is lower than the coercivity of the first recording layer 11 at the temperature Tw. At the temperature Tw, the magnetization pattern 15 of the second recording layer 13 is easily rotated. The magnetization pattern 14 is printed onto the second recording layer 13.

Through a series of the recording operations, the crystal particles in the first and second recording layers adjacent via the intermediate layer behave as substantially one cluster. Consequently, the substantial crystal particle volume of the crystal particles in the first and second recording layers is increased.

Figure 4:
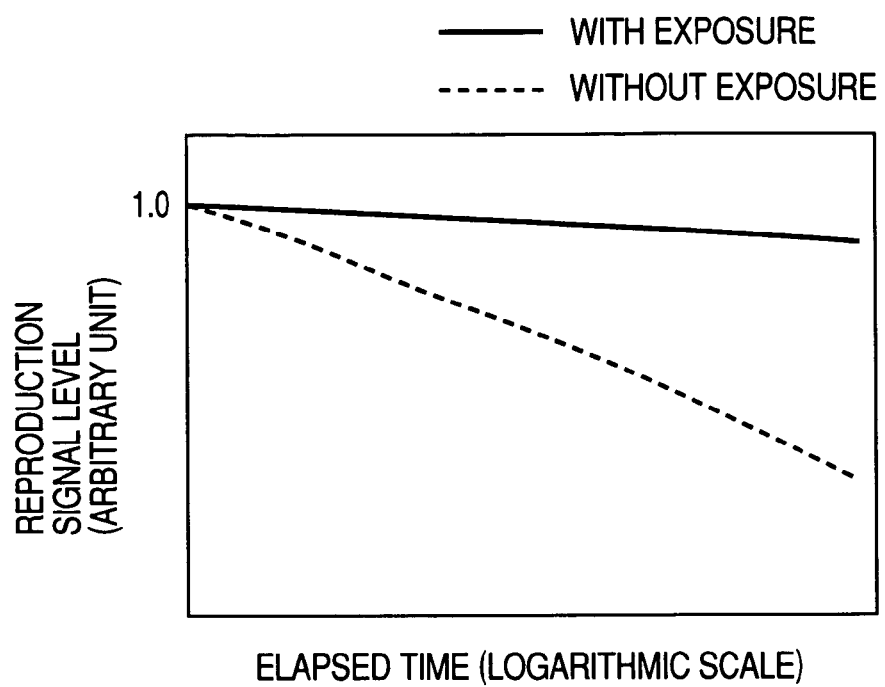
FIG. 4 shows measured data showing the change in thermal decay of magnetization with or without exposure according to the first example.

FIG. 4 shows the change in signal level with elapsed time with or without exposure after recording by the magnetic pole. When performing exposure, apparently, the demagnetization is significantly suppressed and the effective crystal particle volume is increased by thermo-magnetic printing.

Figure 5:
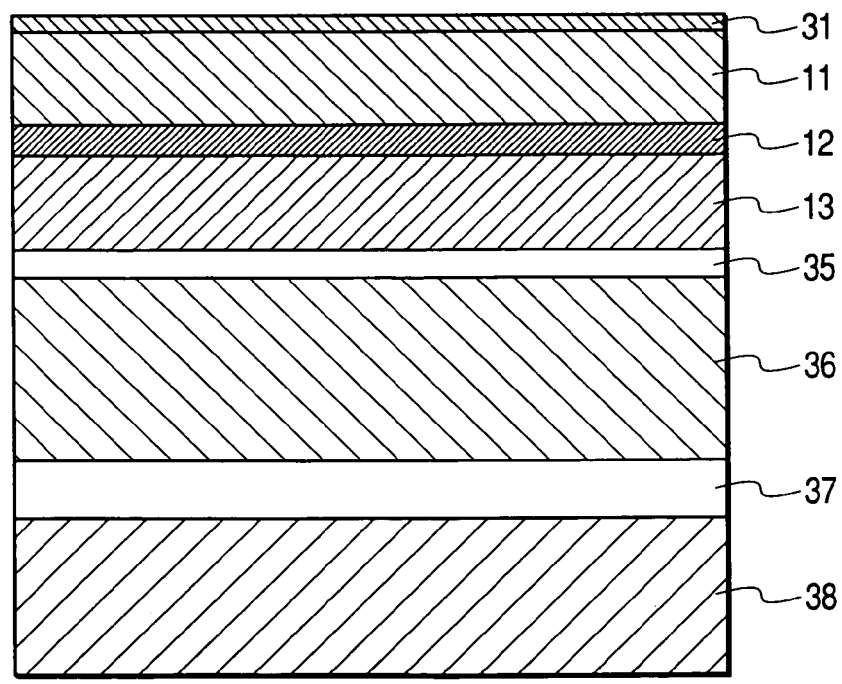
FIG. 5 is a cross-sectional view showing the detail of the structure of the magnetic recording medium used in the first example.

Referring to FIG. 5, the structure of the magnetic recording medium used in this example will be described in detail. In the magnetic recording medium, a buffer layer 37, the keeper layer 36, a spacer layer 35, the second recording layer 13, the intermediate layer 12, the first recording layer 11, and a protective film and lubricant layer 31 are stacked on a disk substrate 38 in that order.

Aluminum and glass are used as the disk substrate 38. In general, the selection of a substrate material significantly affects the thermal conduction of the system. The buffer layer 37 must be selected so as to optimize heating and cooling processes. When an aluminum substrate is used and the buffer layer 37 is made only by metal, the thermal diffusion is too large. Heating with a laser light cannot be sufficiently conducted. When using an oxide of Al or Si for part of the buffer layer 37, the thermal diffusion is suppressed and temperature rise can be done in a very short time. The heating and cooling characteristics in this case are the same as that of a glass substrate.

The flux keeper layer 36 efficiently transmits the magnetic flux 16 from the magnetic pole 17 of the magnetic recording device 101 to an auxiliary pole. The characteristic of the flux keeper layer significantly affects the recording characteristic. In view of the intensity of the recording field, generally, the saturation magnetization of the flux keeper layer is desirably large. High magnetic permeability makes the recording efficiency higher.

The ferromagnetic material having large saturation magnetization typically has poor soft magnetic characteristic and often has a complicate magnetic domain structure. The magnetic domain causes spike noise, which is said to deteriorate the error rate of the apparatus. In the present invention, it is considered that a magnetic field not from the first recording layer during the operation of thermo-magnetic printing is superimposed to disturb the magnetization pattern of the second recording layer.

In this example, as the flux keeper layer 36, an amorphous alloy containing Co, for example, a microcrystal material such as CoTaZr or FeTaC is used so as to satisfy good recording characteristic, suppression of spike noise and robustness for stray field at the same time. The flux keeper layer made of a multilayer basically having a three-layered structure of ferromagnetic layer/nonmagnetic layer/ferromagnetic layer is used. No significant spike noise can be observed. Ru, Rh, Cr and Ir are used for the nonmagnetic layer so as to almost completely suppress spike noise. It is thought that antiferromagnetic coupling occurs in the upper and lower ferromagnetic layers to make the magnetic domain structure more stable. When using the flux keeper layer of the antiferromagnetic coupling type, the magnetic permeability is suitably suppressed so as to realize robustness for stray field and high recording efficiency.

In the second recording layer 13, Gd, Nd, Dy, Ho and Er are used as the rare-earth element in addition to Tb, and Fe, Ni and Co are used singly or in combination as the transition metal, which can the same characteristic. The rare-earth element and a garnet type oxide containing Fe or Co, MnBi, can obtain the same temperature characteristic. Quite the same structure as that of this example can be realized.

As the intermediate layer 12, Ru is used to obtain an optimum recording characteristic. An alloy containing Cr or Ti is used to obtain almost the same characteristic. The intermediate layer 12 is important as the underlayer of the first recording layer 11 and can suppress dispersion of the magnetic particles of the first recording layer 11.

As the first recording layer 11, the same material as that of the recording layer used for normal perpendicular magnetic recording can be used. A polycrystal magnetic film obtained by isolating the CoCrPtB crystal in Si—O is used here. An artificial lattice film such as Co/Pt or. Co/Pd multilayer may be used.

Figure 6:
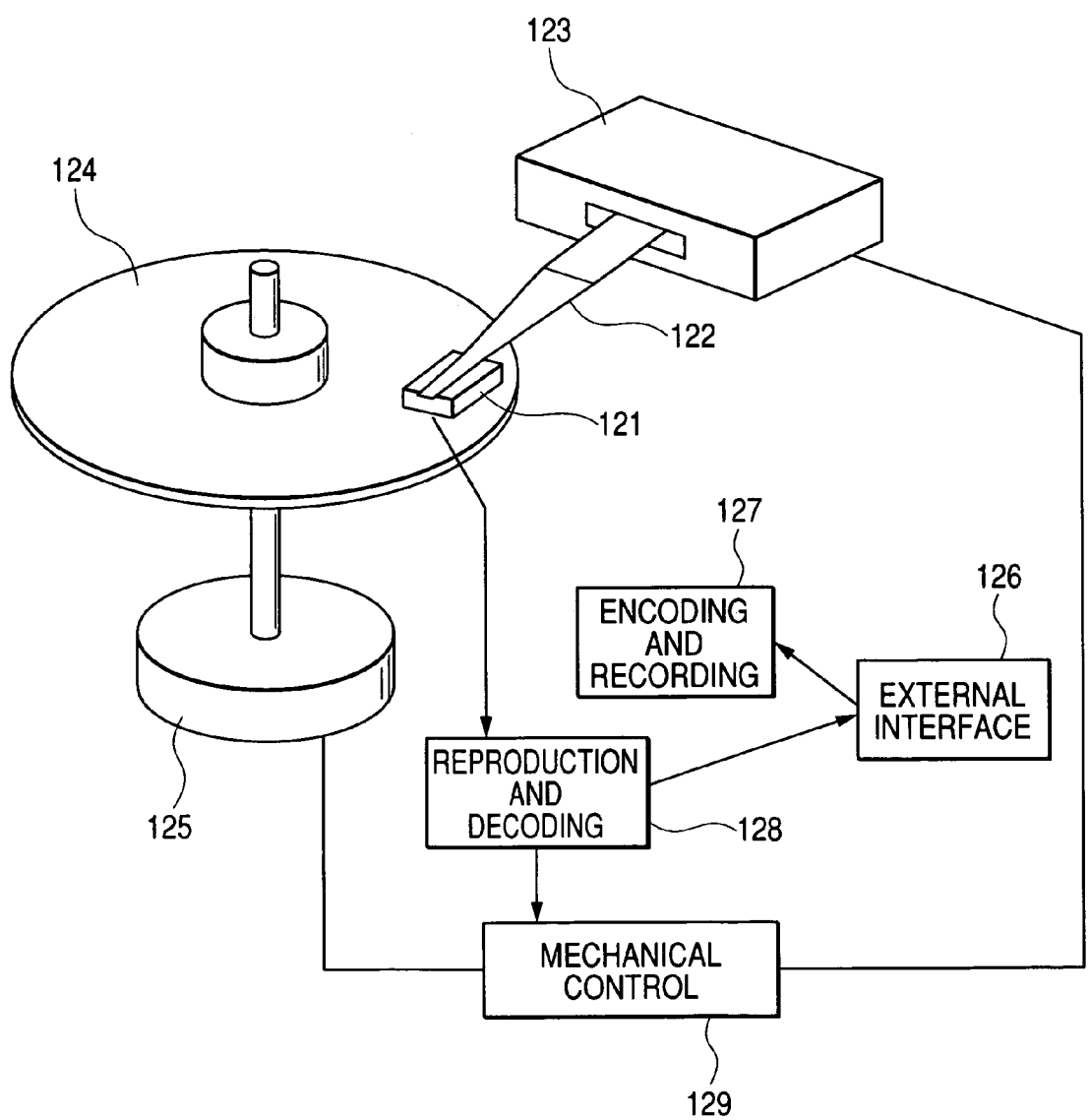
FIG. 6 is a conceptual diagram of a magnetic disk recording apparatus applying the first example.

FIG. 6 shows a conceptual diagram of a magnetic disk recording apparatus on which the magnetic recording head having the medium heating means and the magnetic recording medium disclosed in this example are mounted. A slider 121 forming the magnetic recording head is supported by a suspension arm 122 to be positioned on a disk 124 by a mechanism for head positioning 123 for reading and writing information in a desired location.

Rotation of the disk 124 is controlled by a spindle motor 125. A signal indicating a position (servo signal) is recorded on the disk 124. The servo signal read by the head is processed by a circuit for mechanical control 129 to be fed back to the mechanism for head positioning 123 for performing closed loop control.

User data inputted via an external interface 127 is subject to encoding and equalization by an encoding data and recording part 128 by a method suitable for the magnetic recording system. It is converted to a waveform of writing current for exciting the magnetic recording device to write bits onto the medium. A leak magnetic field from the written bits is sensed by the reproducing device to be converted to an electric signal, and is then subject to an equalization and decoding process by reproduction and decoding 128 by a suitable method for the magnetic recording system for reproducing the user data.

After using the recording method utilizing thermo-magnetic printing in which the present invention is applied to the thus-operated magnetic disk recording apparatus, it is possible to realize a linear density of 2MBPI (MBPI: the number of bits is $10^6$ per inch), and a track density of 250 kTPI (kTPI: the number of tracks is $10^3$ per inch), that is, an areal recording density of 500 gigabits per square inch. This can provide a small, large-capacity and inexpensive magnetic disk recording apparatus.

Example 2

Figure 7:
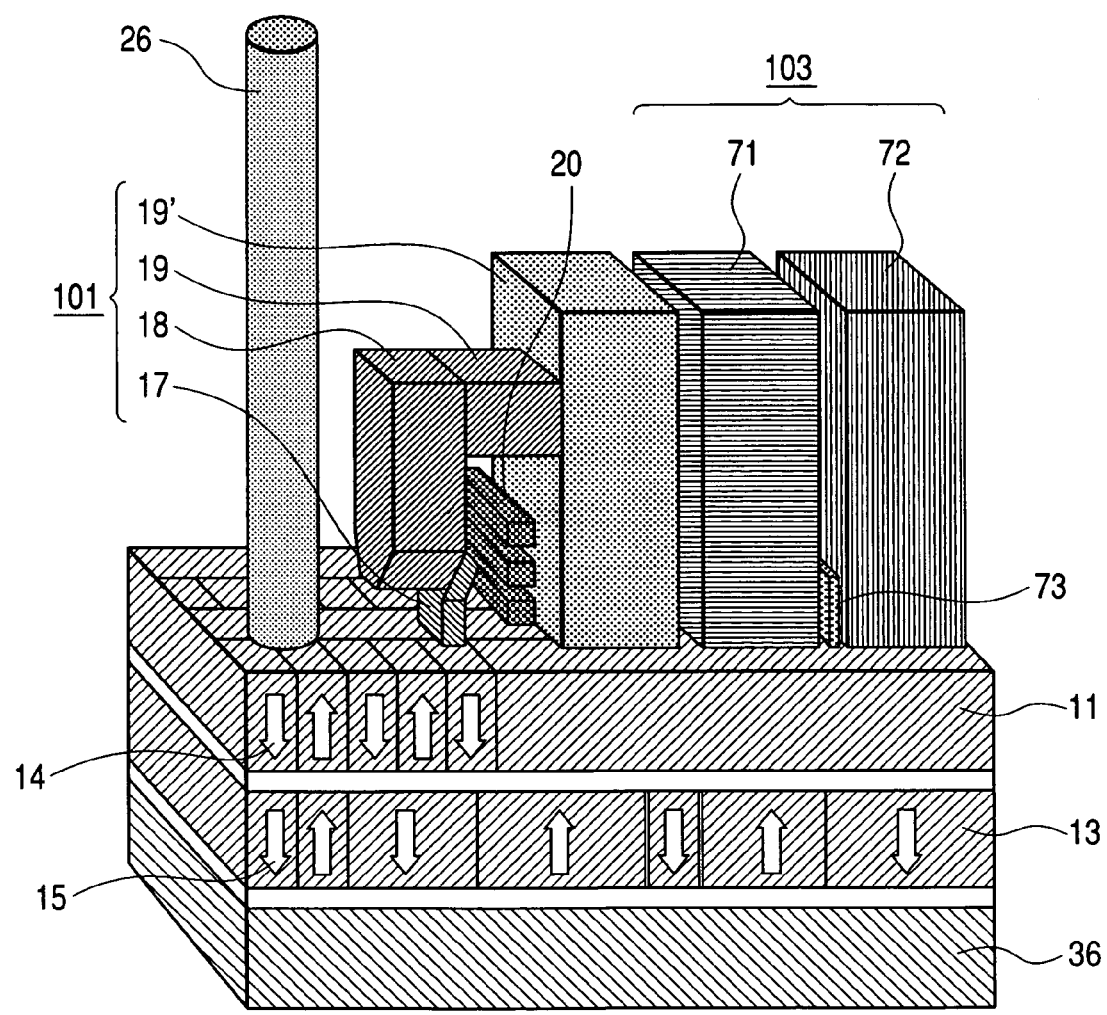
FIG. 7 is a perspective view showing an overwrite operation according to a second example.

FIG. 7 is a perspective view showing the state during an overwrite operation which is an operation writing new recorded data onto old recorded data in the magnetic recording system for thermo-magnetic printing applying the present invention.

After forming a pattern on the first recording layer by a magnetic field from the magnetic pole 17, noting the state before heating-up it by the heating means, the magnetization pattern of the first recording layer 11 is different from the magnetization pattern of the second recording layer 13. Depending on a location in which the recording pattern is formed, a magnetostatic field from the magnetization pattern of the second recording layer 13 may deteriorate the magnetization of the first recording layer 11.

This means that the pattern of old recorded data interferes with new recorded data, which deteriorates the overwrite characteristic as the recording characteristic. To prevent the interference, it is essential to form the intermediate layer 12 between the first and second recording layers.

Figure 8:
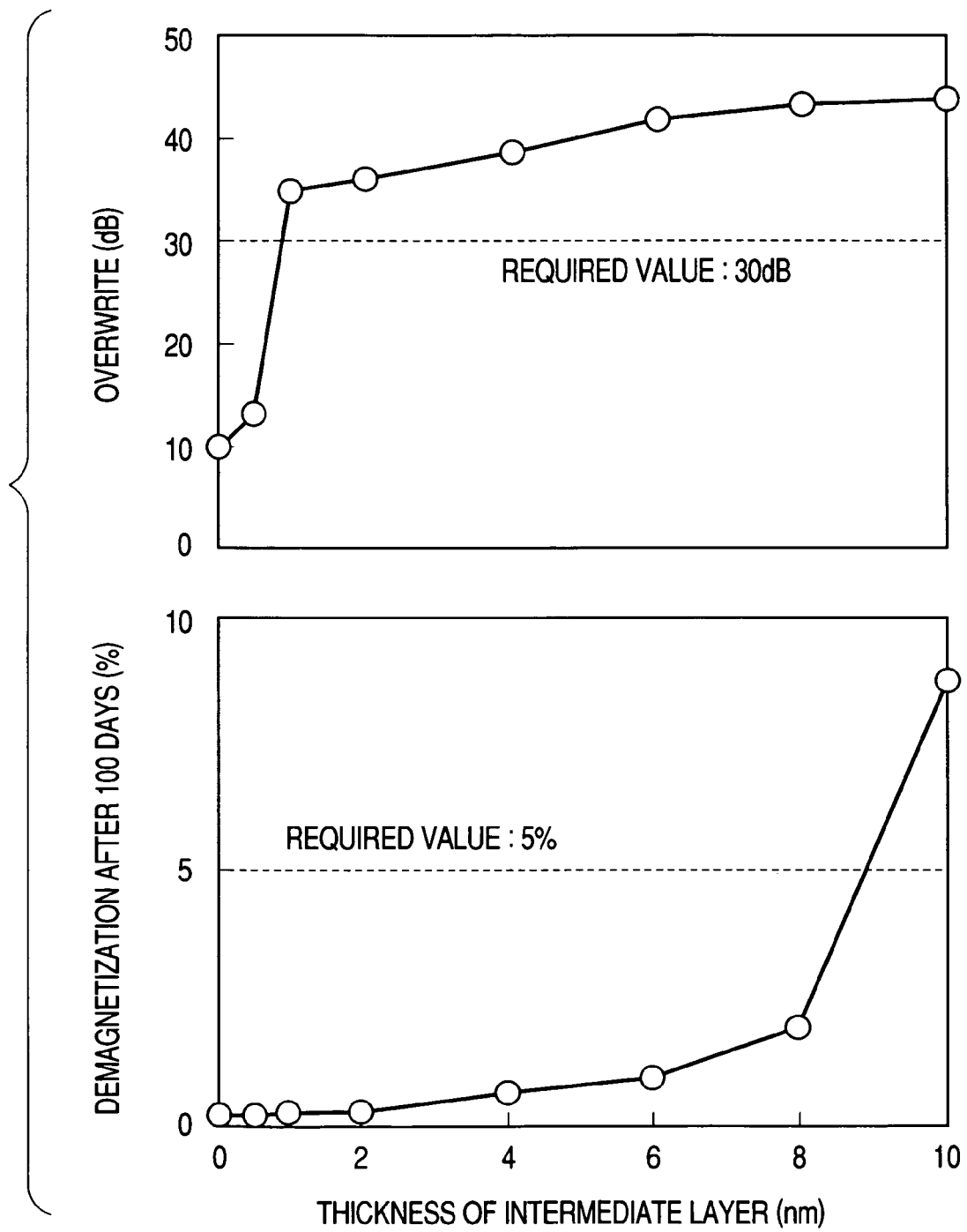
FIG. 8 shows dependence on thickness of intermediate layer of overwrite and demagnetization according to the second example.

FIG. 8 shows results obtained by measuring overwrite characteristic and signal deterioration amount after 100 days of a magnetic recording medium whose intermediate layer is changed from 0 (without the intermediate layer) to 10 nm, which has been subject to a recording operation.

When there is not the intermediate layer, exchange coupling occurs between the first and second recording layers. The magnetization state of the second recording layer strongly interferes with recording onto the first recording layer by a magnetic field. It is difficult to write a new magnetization pattern onto the first recording layer. The overwrite characteristic is very poor. Such film structure is found to be unsuitable for recording utilizing thermo-magnetic printing. When interposing the intermediate layer as in the present invention, the overwrite characteristic is improved.

The film thickness of the intermediate layer is desirably above 1 nm. This is because a magnetostatic field from old recorded data left in the second recording layer prevents excessive interference in the overwrite process. When the thickness of the intermediate layer exceeds 8 nm, the signal deterioration amount due to thermal decay of magnetization is rapidly increased. It is considered that since the first and second recording layers are too far away from each other, the magnetostatic coupling in thermo-magnetic printing is weak and the printing of the magnetization pattern is insufficient.

From the study of this example, the thickness of the intermediate layer is desirably 1 to 8 nm.

Example 3

Figure 9:
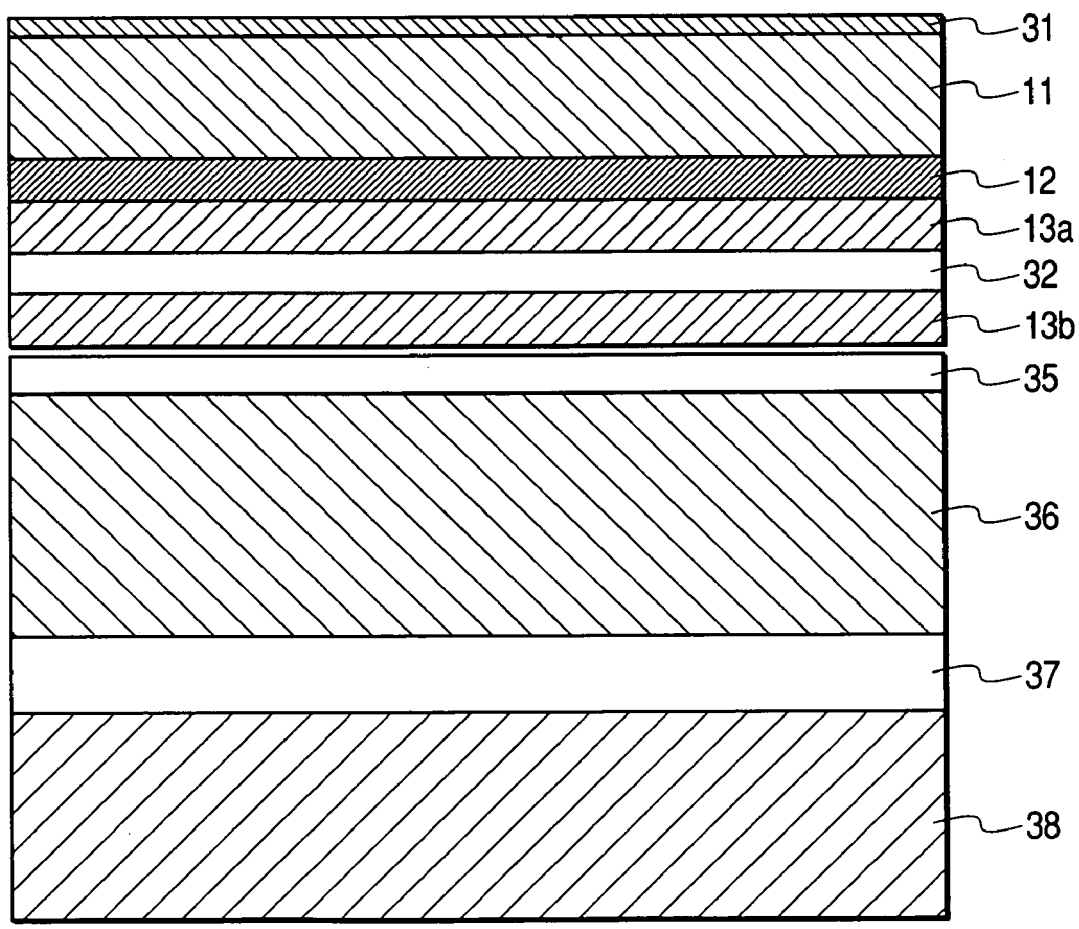
FIG. 9 is a cross-sectional view showing the detail of the structure of a magnetic recording medium used in a third example.

FIG. 9 is a cross-sectional view of a magnetic recording medium used in a third example. The second recording layer of the magnetic recording medium in the third example has a three-layered structure of upper ferromagnetic layer 13a/anti-parallel coupling layer 32/lower ferromagnetic layer 13b. As the upper ferromagnetic layer 13a, there is selected a material whose saturation magnetization at low temperature is smaller than that of the lower ferromagnetic layer 136b and in which a Curie temperature at which magnetization disappears is high. Ru, Rh, Cr and Ir are used as the anti-parallel coupling layer 32 to couple the magnetization patterns of the upper and lower ferromagnetic layers to be always anti-parallel.

Figure 10:
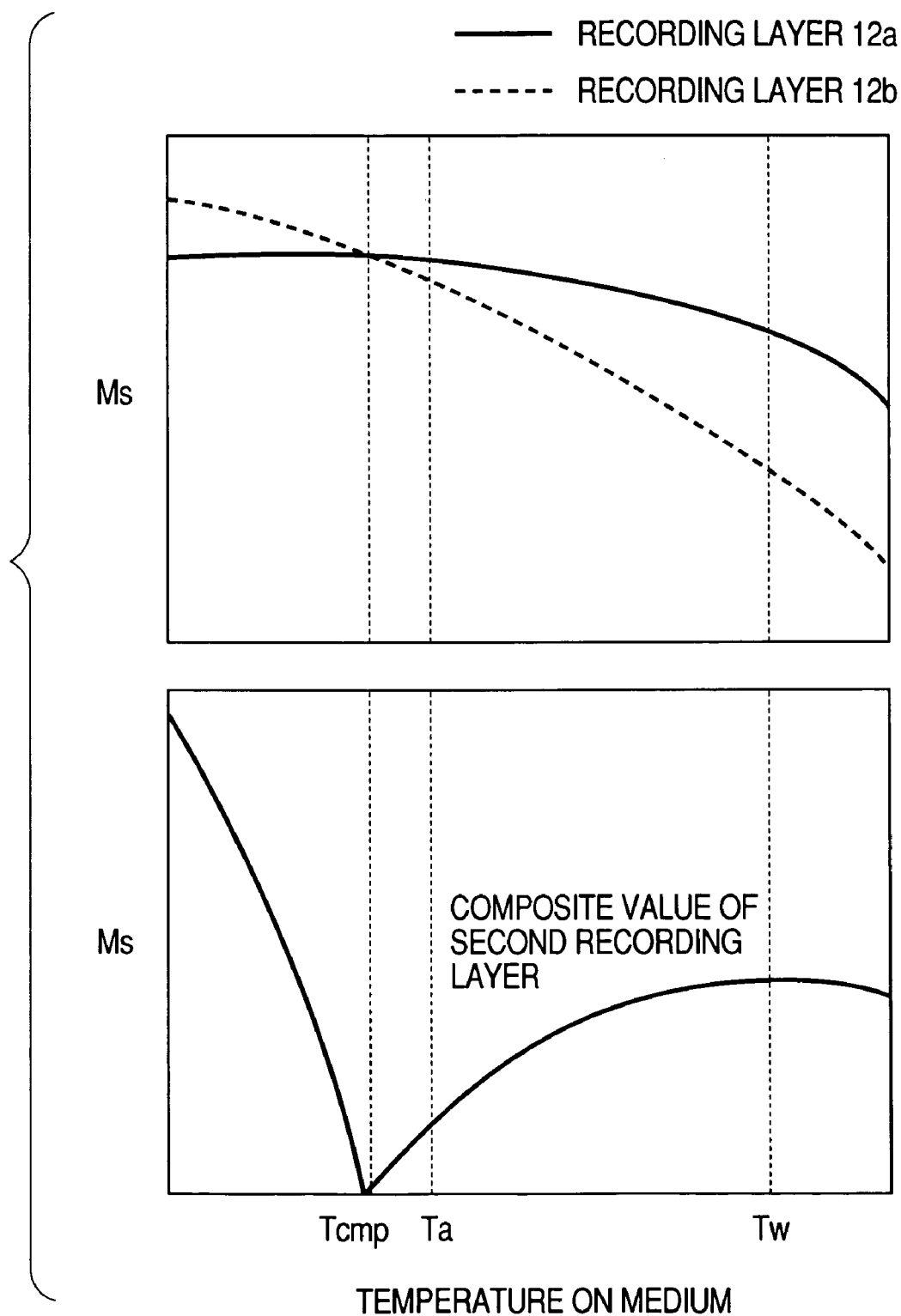
FIG. 10 is a characteristic diagram showing temperature dependence of saturation magnetization of the magnetic recording medium used in the third example.

FIG. 10 is a characteristic diagram showing temperature dependence of saturation magnetizations of the upper and lower ferromagnetic layers and a characteristic diagram showing temperature dependence of saturation magnetization of the second recording layer having a three-layered film (upper ferromagnetic layer 13a/anti-parallel coupling layer 32/lower ferromagnetic layer 13b).

From the temperature characteristic of the upper and lower ferromagnetic layers and their anti-parallel coupling, the behavior to the temperature of total saturation magnetization of the three-layered film to the temperature is found to be quite the same as that of the single-layer ferrimagnetic film shown in FIG. 3.

The second recording layer has a three-layered film. In the upper and lower ferromagnetic layers, not only the rare-earth compound which is not generally easily handled but also the ferromagnetic substance having Co or Fe as the main ingredient can be used. Recording utilizing thermo-magnetic printing is thus found to be enabled.

Example 4

Figure 11:
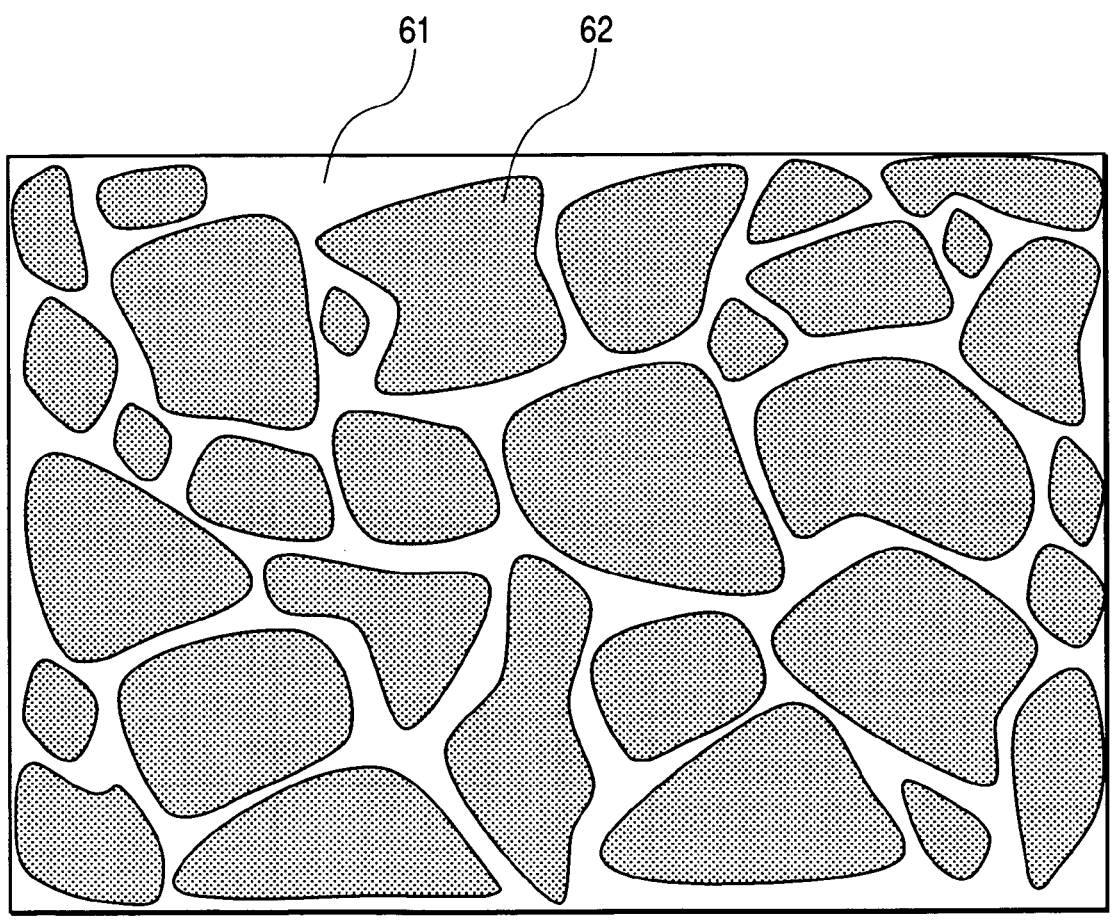
FIG. 11 is a plane observation diagram of a second recording layer of a magnetic recording medium used in a fourth example.

FIG. 11 shows a plane TEM observation image of the second recording layer of a magnetic recording medium used in a fourth embodiment. In the above examples, irrespective of the fact that the second recording layer is a single layer or multilayer, magnetic substances are successive along the surface of the film. In the magnetic recording medium of Example 4, as shown in FIG. 11, a film structure in which magnetic particles 62 made of ferrimagnetic substance are isolated in a nonmagnetic substance 61 is employed. As the nonmagnetic substance 61, an oxide or a nitride of any one of Al, Si and Ta is used. When using the oxide, the magnetic particles are corroded so that it is found to be unsuitable. When using the nitride, the corrosion resistance is good and the magnetic particles are isolated so that the S/N ratio is improved by about 2 dB as compared with that of the successive film structure. As the magnetic particles 62, any one of the materials shown in Examples 1 to 3 is used to obtain the same result.

Example 5

Figure 12:
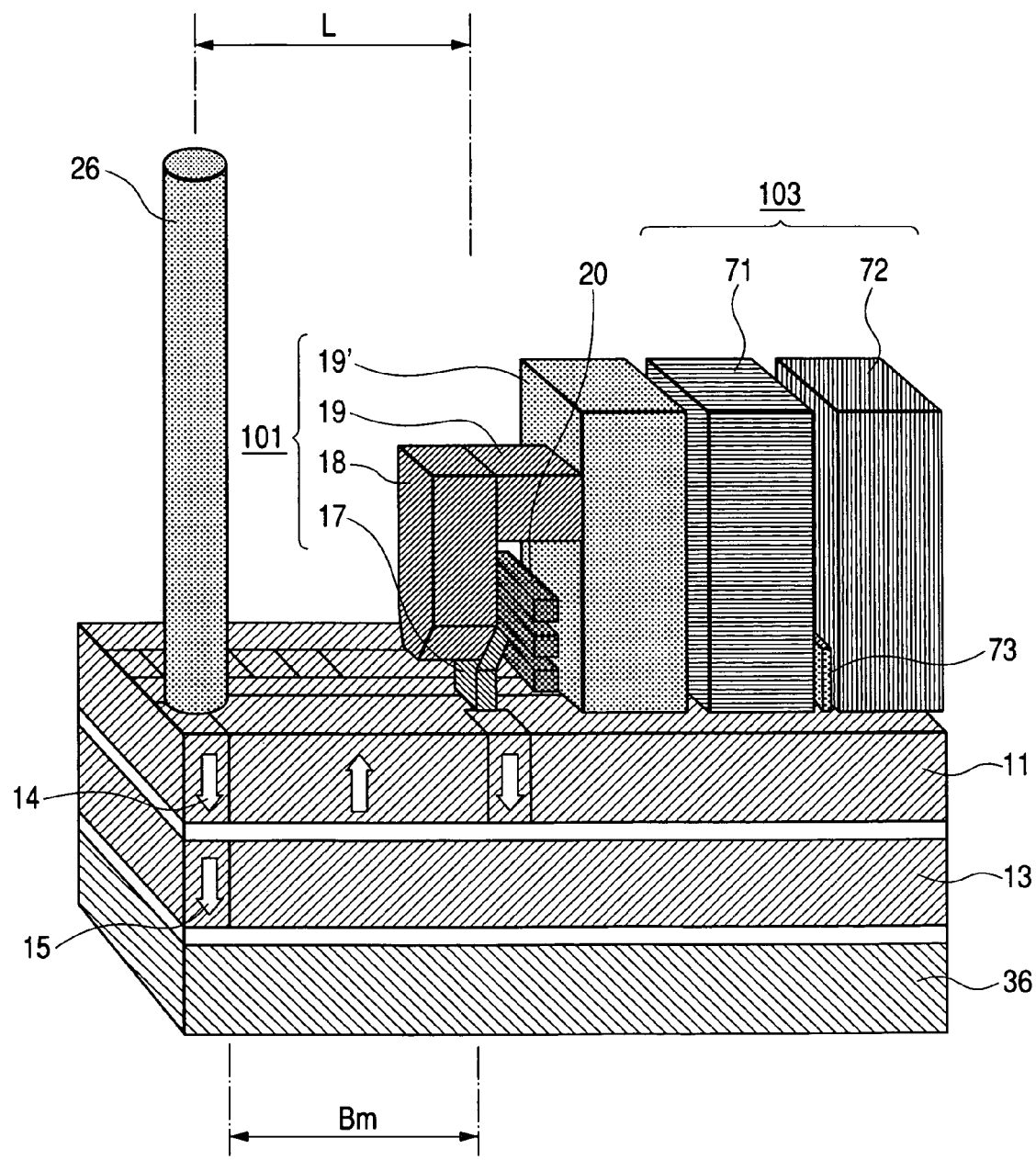
FIG. 12 is a perspective view showing an optimal distance of a magnetic recording device and heating means according to a fifth example.

FIG. 12 shows an optimum value of the distance between the magnetic pole and the heating means in the magnetic recording device in the magnetic disk recording apparatus applying the present invention. L indicates a distance from the edge on the trailing side of the magnetic pole to center of spot of the heating means. B indicates the maximum bit length in this disk apparatus.

To efficiently perform recording utilizing thermo-magnetic printing, the magnetostatic field from the first recording layer at heating-up by the heating means is desirably as large as possible. In general, as the bit length is longer, the magnetostatic field from the recording track is increased. L is desirably as long as possible. In an actual apparatus, the maximum bit length B is fixed by the linear density and the efficiency of signal processing. L must be at least larger than B. That is, L>B is necessary in designing the disk apparatus. In this example, the design rule is applied to perform recording utilizing thermo-magnetic printing at high efficiency to construct the magnetic disk recording apparatus operated stably in a long period.

The trailing side is the position on the same side as the magnetic recording device to the magnetic recording medium and the back side from the recording field generation portion of the magnetic recording device with respect to the relative motion of the magnetic recording device to the magnetic recording medium.

Example 6

In the above examples, the ferrimagnetic substance having a compensation temperature is used as the second recording layer. Any magnetic substance in which by heating, the saturation magnetization is increased and the coercivity or the anisotropy magnetic field is decreased can realize the same recording operation.

Figure 13:
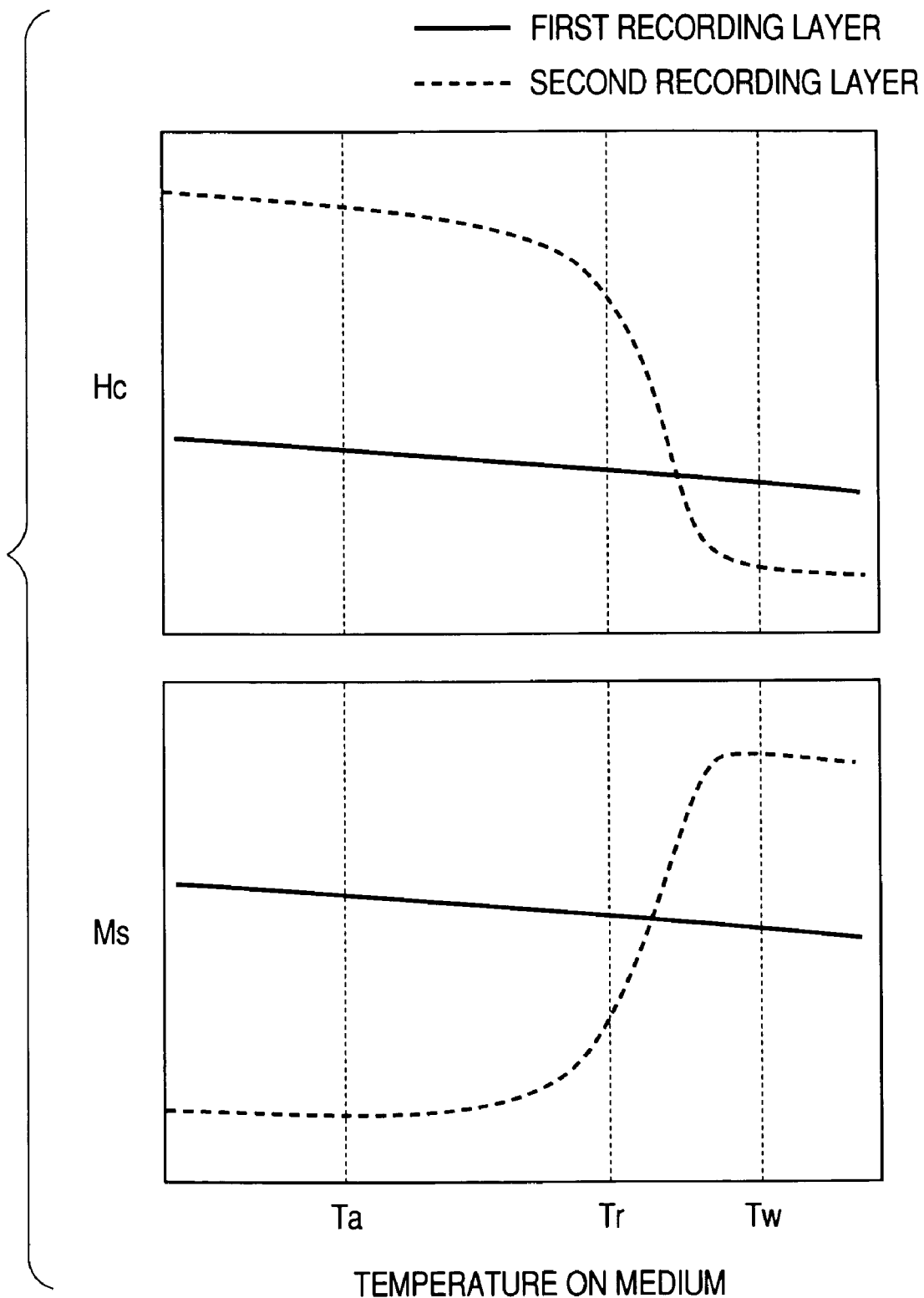
FIG. 13 is a characteristic diagram showing temperature dependence of the magnetic characteristic of a magnetic recording medium used in a sixth example.

FIG. 13 shows an example thereof and shows the magnetic characteristic of the respective recording layers when a two-layered film having FePt/FeRhIr is used as the second recording layer and the same structure as that of Example 1 except for the second recording layer is used.

When seeing FIG. 13, the coercivity of the second recording layer is larger than that of the first recording layer at the ambient temperature Ta, and the saturation magnetization of the second recording layer is larger at the recording temperature Tw than at 1 Ta. As described in Example 1, this satisfies the requirement realizing the recording utilizing thermo-magnetic printing of the present invention.

As is generally known, the FeRh alloy has a characteristic in which it is an antiferromagnetic substance at low temperature and is a ferromagnetic substance at a temperature higher than a certain transition temperature. The antiferromagnetic substance does not have saturation magnetization. In this example, the second recording layer includes the FePt film. The saturation magnetization only of the FePt film appears at the ambient temperature Ta. At the recording temperature Tw set to a temperature higher than the transition temperature Tr, the saturation magnetization of the FeRhRm film is added. The total saturation magnetization is increased.

The rapid lowering of the coercivity of the second recording layer near the transition temperature Tr is caused by the reduction in the anisotropy magnetic field due to increased saturation magnetization.

The FePt/FeRhIr is used here. To correspond to setting of the ambient temperature and recording temperature, the second recording layer can be also structured by other compositions. In the found range, FePtM1/FeRhM2 (M1 has a composition ratio below 30% and is made of any one of Ni, Cr and Pd or a combination of two. M2 is an arbitrary additional element having a composition ratio below 10% and is typically Ir, Ru and Pt.) obtains the same result.

The present invention can be used for a small magnetic disk recording apparatus having a form factor below 3.5 inches using a glass substrate or an aluminum substrate and for a magnetooptical disk recording apparatus using a polycarbonate substrate, particularly, a removable type external storage device which can separate a magnetic recording medium from a recording/reproducing mechanism. The present invention may be used for a magnetic disk recording apparatus having a plurality of magnetic recording/reproducing devices on one surface of a magnetic recording medium.

The invention claimed is:

1. A magnetic disk recording apparatus comprising a magnetic recording medium for thermo-magnetic printing, a recording head having a magnetic recording device applying a recording field, and heating means heating the magnetic recording medium for thermo-magnetic printing,
    wherein said magnetic recording medium for thermo-magnetic printing has a substrate, a first recording layer, a second recording layer formed between said first recording layer and said substrate, and an intermediate layer formed between said first recording layer and said second recording layer, said second recording layer having magnetic anisotropy or coercivity larger than that of said first recording layer at ambient temperature Ta and having magnetic anisotropy or coercivity smaller than that of said first recording layer at temperature Tw set to be higher than the ambient temperature Ta,
    wherein said heating means is arranged on the trailing side of said magnetic recording device,
    wherein after a recording field is applied from said magnetic recording device to form a magnetization pattern on said first recording layer, the magnetization pattern of said first recording layer heated by said heating means is printed onto said second recording layer and
    wherein said second recording layer contains a ferrimagnetic substance having a compensation temperature Temp below the ambient temperature Ta.

2. The magnetic disk recording apparatus according to claim 1, wherein the distance between the center of said heating means in the plane opposite the medium and the trailing side edge portion of said magnetic recording device in the plane opposite the medium is larger than a predetermined maximum recording wavelength.

3. The magnetic disk recording apparatus according to claim 1, further comprising a reproducing head having a reproducing device.

4. The magnetic disk recording apparatus according to claim 1, wherein the thickness of said intermediate layer is in the range of 1 to 8 nm.

5. The magnetic disk recording apparatus according to claim 1, wherein saturation magnetization of the second recording layer at a temperature higher than the ambient temperature Ta is larger than saturation magnetization of the second recording layer at the ambient temperature Ta.

6. The magnetic disk recording apparatus according to claim 1, wherein said ferrimagnetic substance contains a compound of a rare-earth element and a transition metal element.

7. The magnetic disk recording apparatus according to claim 1, wherein said second recording layer has a structure in which an upper ferromagnetic layer and a lower ferromagnetic layer are stacked via an anti-parallel coupling layer.

8. The magnetic disk recording apparatus according to claim 1, wherein magnetic particles made of ferrimagnetic substance in said second recording layer are isolated in a nonmagnetic substance.

* * * * *